(12) United States Patent
Schleinitz

(10) Patent No.: US 6,568,854 B2
(45) Date of Patent: May 27, 2003

(54) LOCKABLE BEARING UNIT

(75) Inventor: Thilo W.-D.v. Schleinitz, Schweinfurt (DE)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/899,127

(22) Filed: Jul. 6, 2001

(65) Prior Publication Data

US 2002/0037119 A1 Mar. 28, 2002

(30) Foreign Application Priority Data

Jul. 7, 2000 (DE) .......................... 100 32 590

(51) Int. Cl.⁷ .............................................. F16C 41/04
(52) U.S. Cl. ..................................................... 384/448
(58) Field of Search ............................. 384/448, 556, 384/101, 102, 624; 188/31, 69; 192/69.8, 85 CA, 85 AT, 110 B (56) References Cited

U.S. PATENT DOCUMENTS

| | | | |
|---|---|---|---|
| 2,647,807 A | | 8/1953 | Brunstrum |
| 3,642,331 A | * | 2/1972 | Silver .......................... 384/102 |
| 4,183,589 A | * | 1/1980 | Heenan ....................... 384/624 |
| 4,325,591 A | * | 4/1982 | Otto ............................ 277/551 |
| 4,425,010 A | * | 1/1984 | Bryant et al. ................ 384/613 |
| 4,460,058 A | * | 7/1984 | Welschof et al. ........... 180/258 |
| 4,477,126 A | * | 10/1984 | Price ............................ 188/110 |
| 4,623,269 A | * | 11/1986 | Burg ............................ 384/548 |
| 4,641,978 A | * | 2/1987 | Kapich ....................... 310/90.5 |
| 4,664,539 A | * | 5/1987 | Li ................................ 384/102 |
| 4,811,992 A | * | 3/1989 | Steiner ........................... 301/1 |
| 5,129,743 A | * | 7/1992 | Faye et al. .................. 310/168 |
| 5,201,270 A | | 4/1993 | Dörsam et al. |
| 5,232,072 A | | 8/1993 | Pluta |
| 5,720,371 A | * | 2/1998 | Kimura et al. .............. 524/359 |
| 5,725,316 A | | 3/1998 | Barbero et al. |
| 5,810,485 A | * | 9/1998 | Dublin et al. ............... 384/102 |

FOREIGN PATENT DOCUMENTS

| | | |
|---|---|---|
| DE | 954 928 | 12/1956 |
| DE | 1 094 635 | 12/1960 |
| DE | 1 904 954 | 6/1970 |
| DE | 29 27 033 A1 | 1/1981 |
| DE | 41 04 137 A1 | 8/1992 |
| DE | 41 13 491 A1 | 10/1992 |
| DE | 44 25 807 A1 | 1/1996 |
| DE | 195 35 272 A1 | 4/1997 |
| DE | 196 18 808 A1 | 11/1997 |

* cited by examiner

Primary Examiner—David A. Bucci
Assistant Examiner—Julie K. Smith
(74) Attorney, Agent, or Firm—Burns, Doane, Swecker & Mathis, LLP (57) ABSTRACT

A bearing unit includes a first bearing ring, a second bearing ring rotatable relative to the first bearing ring, and a locking device. The locking device, in a first operating state, permits relative rotation between the first bearing ring and the second bearing ring and in a second operating state interconnects the first bearing ring and the second bearing ring in a form-fit manner. The locking device is integrated in the bearing unit and can be switched between the first and the second operating state by remote control.

22 Claims, 5 Drawing Sheets

LOCKABLE BEARING UNIT

This application is based on and claims priority under 35 U.S.C. § 119 with respect to German Application No. P 100 32 590.4 filed on Jul. 7, 2000, the entire content of which is incorporated herein by reference.

FIELD OF THE INVENTION

The present invention generally relates to bearing units. More particularly, the present invention pertains to a lockable bearing unit and a method for locking a bearing unit.

BACKGROUND OF THE INVENTION

A known bearing unit is disclosed in German Auslegeschrift No. 1 904 954. This document discloses a journal-free rotary connection provided with a braking device configured as a disk brake.

A need exists for a device usable in conjunction with machine parts that are rotatable relative to one another, by which the rotary movement can be optionally disabled or enabled.

A need also exists for a method by which the rotatable movement of machine parts is capable of being permitted (enabled) and prevented (disabled) as desired.

SUMMARY OF THE INVENTION

The present invention provides a mechanism used in conjunction with machine parts that are rotatable relative to one another to optionally enable and disable the relative rotational movement of the machine parts led or enabled. The invention also involves a method for disabling and enabling such rotary movement.

In the bearing unit according to the present invention, the relative rotary or rotational movement between first and second bearing rings is disabled by virtue of a locking device that is integrated into the bearing unit to interconnect the first and the second bearing rings in a form-fit manner. This locking device can be remote controlled.

The form-fit connection, in contrast to a friction brake, has the advantage that precise locking against rotation is reliably guaranteed even at very high torques. A further advantage is that relatively little power is required to create or cancel the operation of the lock. As a result, little difficulties arise with respect to dissipating heat. In addition, the design is relatively compact and so the invention can be used even in bearings with small geometric dimensions. Also, it is possible to substantially eliminate brake linings which are subject to wear and thus cause additional maintenance costs.

Integrating the locking device into the bearing unit also provides the advantage that the bearing unit can be locked exclusively by components contained in or integrated into the bearing unit. Thus, other than the necessary control connection, external machine parts are generally not required. That is, the bearing unit according to the present invention can be mounted like a conventional bearing and does not require any significantly special installation environment. Care should be taken in generally ensuring that the bearing rings are mounted so as to be secure against rotation.

The bearing unit according to the present invention has the further advantage that the form-fit connection between the first and second bearing rings can be produced in many different ways. This allows the conditions of a specific application to be optimally taken into account. For instance, a relatively precise lock between the inner and outer raceways by mutually engaging gear teeth is just as possible as an inexpensive and highly compact lock produced by way of a pin/bore combination.

The bearing unit according to the present invention also has a wide range of application and generally universal use in that it can be configured for all the usual control methods such as pneumatic control, hydraulic control, mechanical control, electrical or magnetic control.

According to an aspect of the present invention, a bearing unit includes a first bearing ring mounted about a shaft and a second bearing ring mounted about the shaft, with the first and second bearing rings being relatively rotatable with respect to one another. A locking device selectively locks the first bearing ring relative to the second bearing ring, and includes a piston in the bearing unit urged in one direction by a biasing force to produce an unlocked state of the locking device in which relative rotational movement between the first bearing ring and the second bearing ring is permitted, and movable in opposition to the biasing force to produce a locked state of the locking device in which the first bearing ring and the second bearing ring are interconnected to prevent relative rotational movement of the first bearing ring and the second bearing ring. A control device is operatively connected to the piston to move the piston in opposition to the biasing force to produce the locked state of the locking device.

In accordance with another aspect of the invention, a method for locking a bearing unit that includes first and second bearing rings that are relatively rotatable involves interconnecting the first bearing ring and the second bearing ring in a form-fit manner to lock the bearing unit by a locking device that is integrated in the bearing unit, with the form-fit interconnection being canceled to cancel the lock of the bearing unit. The form-fit interconnection of the first bearing ring and the second bearing ring is established and canceled by remote control.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
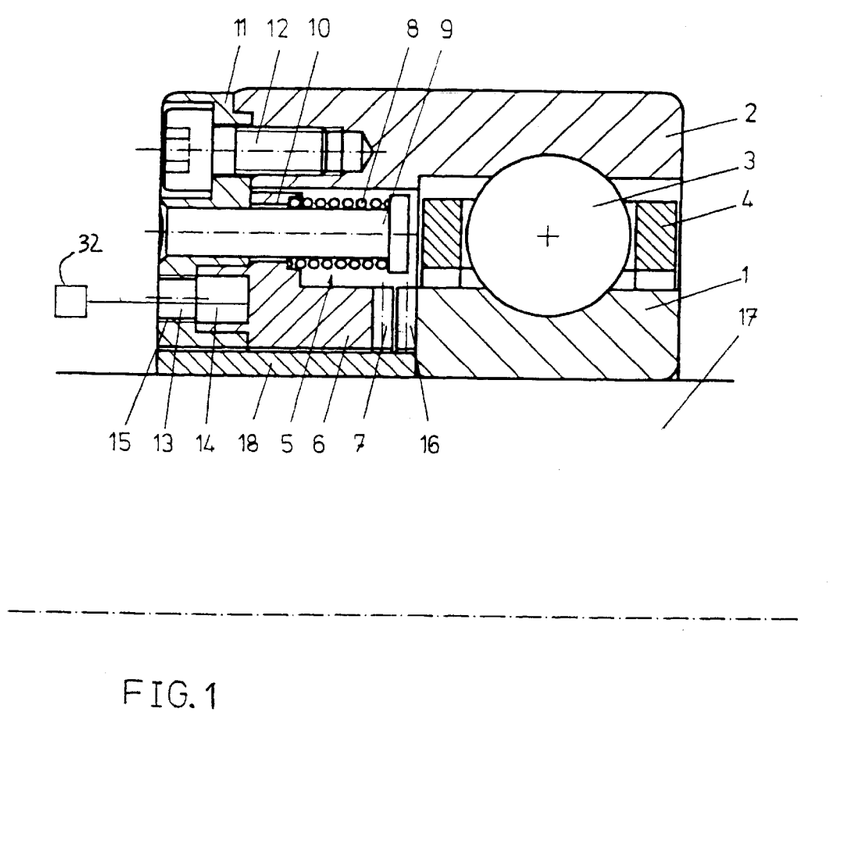
FIG. 1 is a cross-sectional view of a bearing unit, in the form of a radial ball bearing, incorporating a locking device in accordance with one aspect of te invention.

Referring initially to FIG. 1, the illustrated bearing unit according to the present invention is in the form of a radial ball bearing. The illustrated bearing unit includes an inner race 1, an outer race 2 and rolling elements 3 in the form of balls arranged between the inner race 1 and the outer race 2. The rolling elements 3 are fixed or secured by way of a cage 4. The bearing unit further includes a locking device 5.

The locking device 5 is comprised of an actuator and an elastic device(s) that applies a biasing force to the actuator. In the embodiment shown in FIG. 1, the actuator is in the form of a piston 6 and the elastic device is in the form of helical springs 8. The end face of the piston 6 is provided with gear teeth 7. The piston 6 includes guide bores 10 that each receive a pin 9. The helical springs 8 are threaded onto the pins 9, and the pins 9 are fixed in an annular base plate 11, for instance by caulking. Although FIG. 1 only shows a single helical spring 8, a single base 10 and a single pin 9, it is to be understood that a plurality of circumferentially disposed springs 8, pins 9 and bases 10 are provided.

The base plate 11 is bolted to the outer race 2 by way of bolts 12 and is provided with a compressed air duct 13 leading to a circumferential groove 14 formed in the piston 6. The compressed air duct 13 is provided with an internal thread 15 for connection to a compressed air line. The inner race 1 is also provided with gear teeth 16. These gear teeth 16 are positioned axially opposite to the gear teeth 7 of the piston 6, or in axially facing relation to the gear teeth 7 of the piston 6. To facilitate assembly of the bearing unit on a shaft 17, a spacer sleeve 18 is provided.

The bearing unit according to the invention is illustrated in FIG. 1 in its unlocked state. In this unlocked state, the inner race 1 and the outer race 2 are capable of freely rotating relative to one another. In the unlocked state of the bearing unit, the locking device 5 is in the standby state. The standby state of the locking device 5 refers to the operating state that the locking device 5 assumes when no compressed air is supplied via the compressed air duct 13. In this operating state of the locking device, the piston 6 is pressed against base plate 11 in the axial direction of the bearing unit by the helical springs 8. Thus, the oppositely positioned and axially facing gear teeth 7 of the piston 6 and the gear teeth 16 of the inner race 1 do not engage each other and thus do not produce a form-fit connection between the inner race 1 and the outer race 2.

If compressed air is supplied to the groove 14 of the piston 6 via the compressed air duct 13, the piston 6 overcomes the biasing or restoring force of helical spring 8 and moves in the axial direction toward the outer race 1. During this displacement or movement of the piston 6, the helical springs 8 are increasingly compressed, and the facing gear teeth 7, 16 gradually approach and finally engage each other, thus producing a form-fit connection between the inner race 1 and the piston 6.

The piston 6 is anchored in the circumferential direction in a form-fitting manner in the base plate 11 via the pins 9. The base plate 11 is connected to the outer race 2 in the circumferential direction in a form-fit manner by the bolts 12. Thus, the form-fitting engagement of the gear teeth 7, 16 of the piston 6 and the inner race 1 ultimately creates a form-fitting connection between the inner race 1 and the outer race 2. This inhibits relative rotation between the inner race 1 and the outer race 2, except for any possible play.

The locking of the bearing unit is maintained as long as the air pressure inside the groove 14 is sufficiently high to equalize or exceed the restoring force of the helical springs 8 in their compressed state. If this pressure decreases, the helical springs 8 relax (expand axially), driven by their restoring force, and displace the piston 6 in the axial direction away from the outer race 1. This axial displacement of the piston 6 is limited by the base plate 11. That is, the end position of the piston 6 is reached when the piston 6 contacts the base plate 11.

The gear teeth 7, 16 of the piston 6 and the inner race 1 are configured in such a way that torque acting on the meshed gear teeth 7, 16 does not push them axially apart, i.e., their form-fit engagement is maintained even in a loaded state. This can be achieved in that the surfaces of gear teeth 7, 16 that contact one another extend in the axial direction.

As discussed above in detail, the bearing unit is automatically locked by supplying compressed air and is automatically unlocked in a pressureless or reduced pressure state. The compressed air is supplied by corresponding hoses, lines or the like so that the bearing unit can be switched by remote control between its locked and its unlocked operating state. Without substantial modification, the embodiment of the present invention depicted in FIG. 1 could also be operated with hydraulic fluid instead of compressed air, it being understood that the dimensioning of the supply duct and the seal might have to be adapted for hydraulic fluid. FIG. 1 schematically illustrates a source 32, which can be a source of compressed air or a source of hydraulic fluid, and a connection line 30 connecting the source of compressed air or hydraulic fluid to the duct 13.

Figure 2:
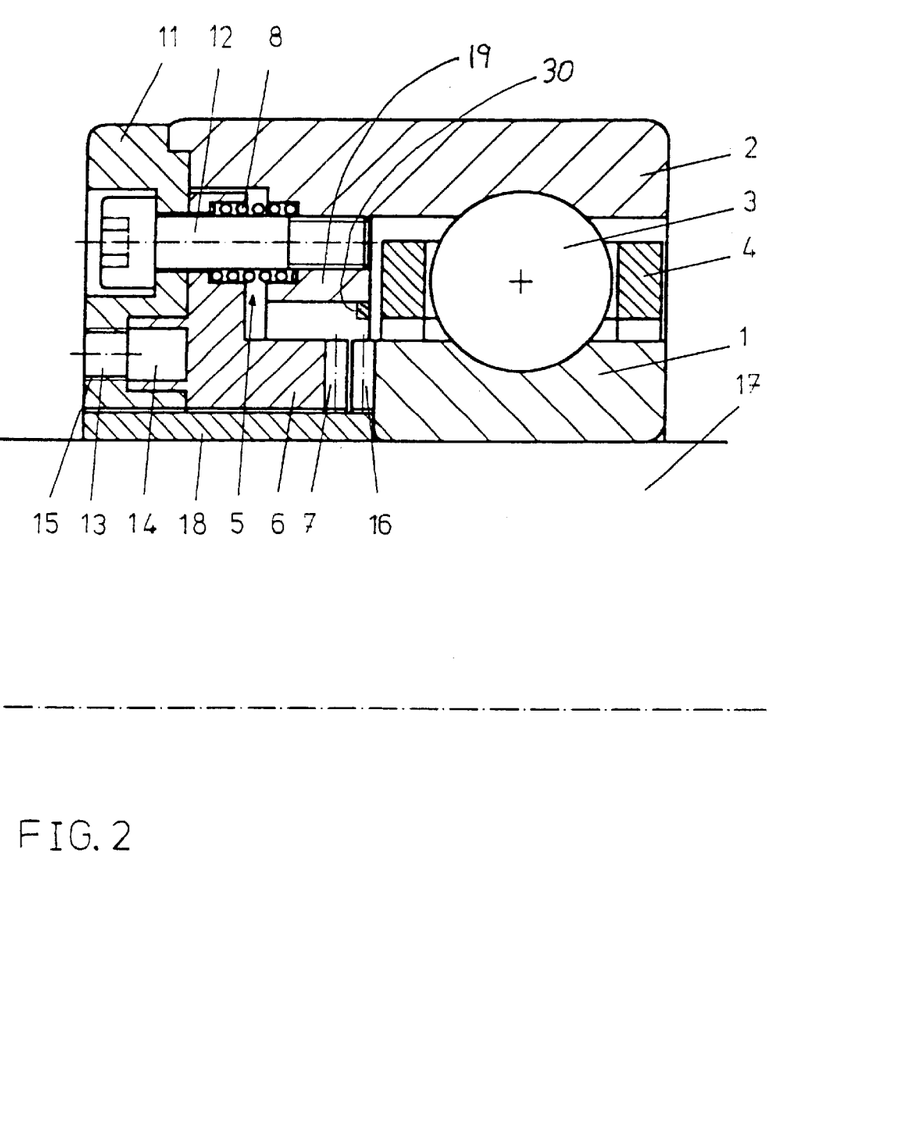
FIG. 2 is a cross-sectional view of a bearing unit, in the form of a radial ball bearing, incorporating a locking device in accordance with another aspect of the invention.

FIG. 2 shows another embodiment of the bearing unit according to the present invention, also in the form of a radial ball bearing. This embodiment is essentially the same as the embodiment described above and shown in FIG. 1, particularly with respect to the configuration of the locking elements which include the axially engaging gear teeth 7, 16. The embodiment shown in FIG. 2 differs, however, in that pins similar to the pins 9 shown in FIG. 1 are not employed. The elimination of the pins in this embodiment is made possible by a radially inwardly directed flange 19 formed on the outer race 2. The bolts 12 are adapted to be screwed into this radially inwardly directed flange. With this configuration, the bolts 12 connecting the outer race 2 to the base plate 11 can additionally assume the functions associated with the pins used in the earlier embodiment. That is, the bolts 12 receive the helical springs 8 and axially guide the piston 6 to effect the form-fit connection in the circumferential direction between the piston 6 and the base plate 11. Except for the difference described above, the embodiment depicted in FIG. 2 is identical to that of the version shown in FIG. 1 with respect to both its construction and mode of operation. Thus, the other features associated with the FIG. 2 embodiment and its manner of operation are not described in detail again.

Figure 3:
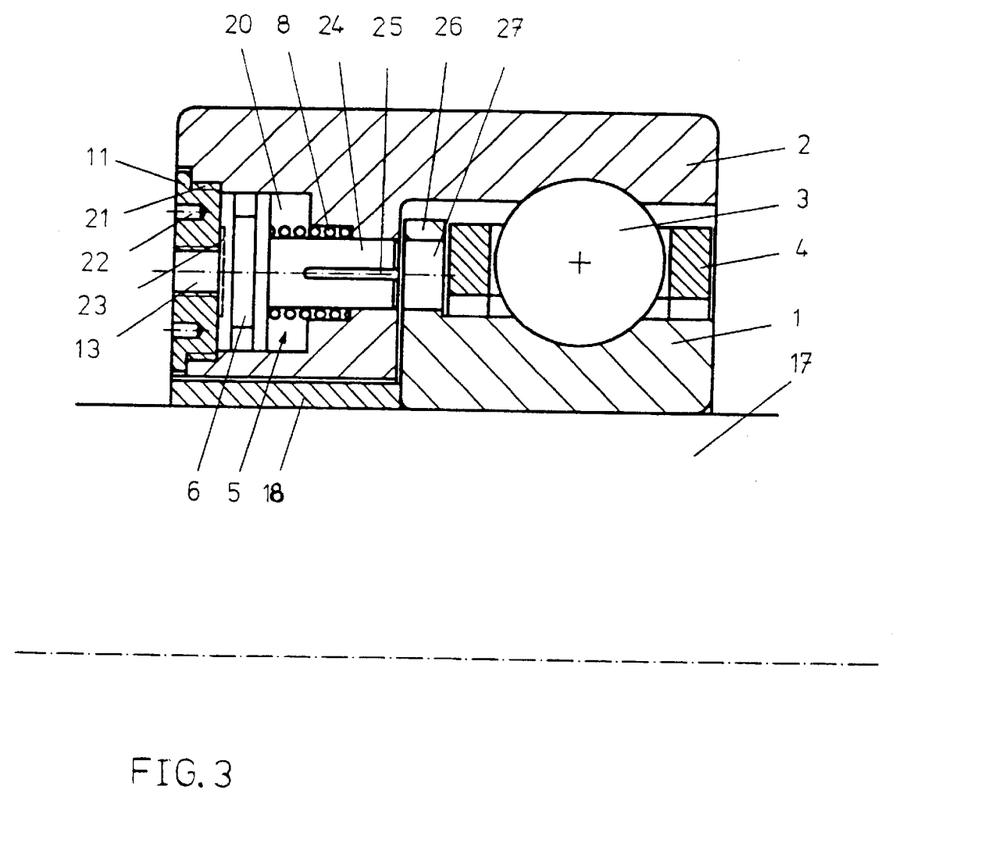
FIG. 3 is a cross-sectional view of a bearing unit, in the form of a radial ball bearing, incorporating a locking device in accordance with a further aspect of te invention.

FIG. 3 illustrates another embodiment of the bearing unit according to the invention, once again in the form of a radial ball bearing. In this embodiment, the locking mechanism is modified as compared to the locking mechanism described above and shown in FIGS. 1 and 2. Generally speaking, the locking mechanism shown in FIG. 3 is changed in that no engaging gear teeth are used. Instead, one or more pins are provided which are adapted to engage respective bores.

More specifically, in the embodiment depicted in FIG. 3, the outer race 2 is provided with at least one axially extending bore 20 configured to possess a multi-stepped configuration. The bore 20 is sealed toward the outside surface of the bearing by a base plate 11 designed as a cover. The base plate 11 thus has an outside or external thread 21 that screws into or threadably engages a correspondingly threaded portion of the outer race 2 at the open end of the bore 20. To enable the base plate 11 to be tightened and loosened, the base plate 11 is preferably provided with blind holes 22 that are adapted to be engaged with a correspondingly shaped tool.

In this version, the compressed air duct 13 is arranged centrally in the base plate 11 and extends in the axial direction. Along the inner bearing surface, the piston 6, which is adapted to be axially displaced in the bore 20, contacts the base plate 11. The end face of the piston 6 that faces the base plate 11 is provided with an indentation or recessed region 23. The end face of the piston 6 that faces away from base plate 11 is provided with an axially extending locking pin 24. Alternatively, a locking pin 24 can be fixed to the piston 6 at such end.

A helical spring 8 is positioned on the locking pin 24. One end of the helical spring 8 is supported against the piston 6 and the other end of the helical spring 8 is supported against the outer race 2. The locking pin 24 has at least one axially extending venting groove 25 through which the bore 20 is vented. In the end region of the bore 20 facing the inside of the bearing unit, the bore 20 is sufficiently narrowed to serves as a guide for the locking pin 24. A radially outwardly directed flange 26 of the outer race 1 is located adjacent to the end region of the bore 20. This flange 26 has at least one axially extending locking bore 27, the diameter of which is preferably the same as or larger than that of the bore 20 in the narrowed end region. The locking bore 27 in cooperation with the locking pin 24 serves to lock the bearing unit.

FIG. 3 shows the bearing unit in its unlocked state, namely the state in which the locking pin 24 does not engage the locking bore 27. In this state, the inner race 1 and the outer race 2 are freely rotatable relative to one another. The locking bolt 24 assumes the depicted position when no compressed air is supplied to the compressed air duct 13. In this case, the piston 6 is driven or urged towards and against the base plate 11 by the restoring or biasing force of the helical spring 8 so that the locking pin 24 is located at its left end position.

If compressed air is directed into the compressed air duct 13, the compressed air flows into the indentation 23 of the piston 6 and presses the piston 6 in the axial direction away from the base plate 11 by overcoming the restoring or biasing force of the helical spring 8. The air present in the bore 20 can escape by way of the venting groove 25 so that no significant back-pressure builds up.

As the piston 6 moves in the manner noted above, the locking pin 24 plunges into the locking bore 27 of the inner race 1 so that a form-fit connection between the inner race 1 and the outer race 2 is produced by way of the locking pin 24. The bearing unit is thus locked. If the pressure in the compressed air duct 13 is lowered again, the piston 6 is driven or moved by the biasing or urging force of the helical spring 8 in the direction toward the base plate 11. The locking pin 24 is thus pushed out of the locking bore 27 and the bearing unit is unlocked.

An advantageous aspect of the embodiment of the invention shown in FIG. 3 is that the bearing unit cannot be locked at just any angle of rotation because the locking pin 24 and the locking bore 27 must be located opposite one another (i.e., aligned with one another) to enable the locking pin 24 to move into the locking bore 27. If this is not the case, the locking pin 24 is simply pressed against the sidewall of the flange 26. The friction between the end face of the locking pin 24 and the sidewall of the flange 26 may impede the rotary movement, but a form-fit lock is not achieved in such a situation.

The form-fit lock can take place only when the inner race 1 and the outer race 2 are sufficiently rotated relative to one another to permit the locking pin 24 and the locking bore 27 to coincide. When this coincidence occurs, the locking pin 24 moves into the locking bore 27 and locks the bearing unit in a form-fit manner. Until the actual form-fit lock is achieved, the inner race 1 and the outer race 2 are thus still capable of being rotated relative to one another over an angle of rotation formed between the locked pin 24 and the locking bore 27 at the time when locking is activated. The maximum value of this angle of rotation up until the actual locking depends on the number and the arrangement of locking pins 24 and locking bores 27.

Considering an embodiment in which a single locking pin 24 and a single locking bore 27 of corresponding diameters are provided, the maximum angle of rotation is less than 360 degrees. Thus, the inner race 1 and the outer race 2 can travel or rotate relative to one another over a maximum amount that is almost equal to an entire turn. If several locking bores 27 are regularly or evenly distributed over the circumference, the maximum angle of rotation is reduced accordingly. If certain preferred stop positions are desired, it is also possible to provide an irregular distribution of locking bores 27 as a function of the stop positions. Further, several locking pins 24 may be provided, either in combination with one locking bore 27 or with several locking bores 27. This makes it possible to reduce the maximum angle of rotation or to increase the maximum lockable torque in that several locking pins 24 simultaneously move into locking bores 27.

Figure 4:
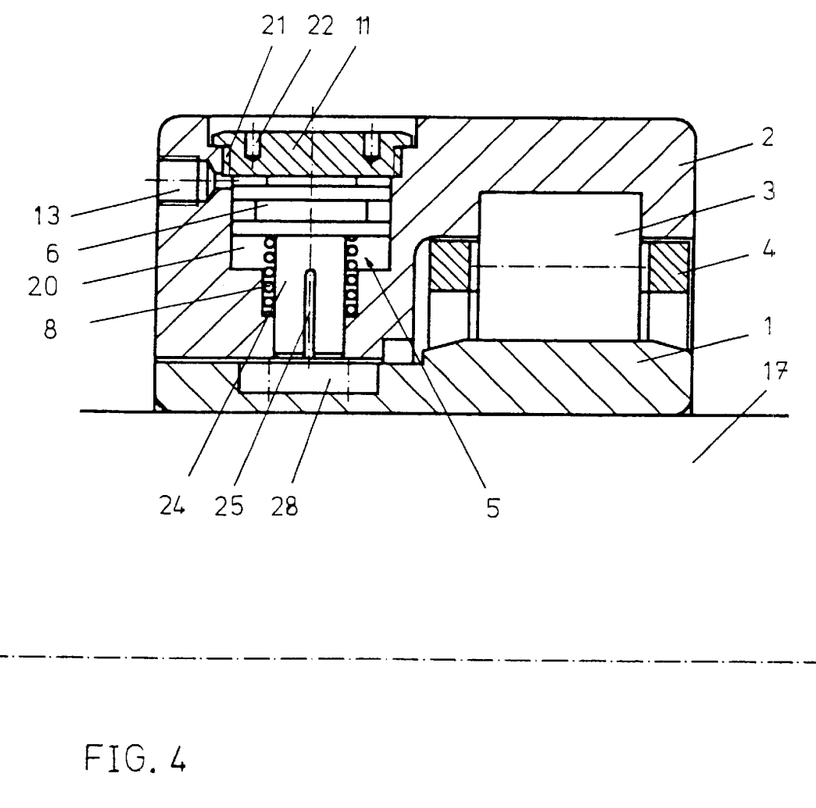
FIG. 4 is a cross-sectional view of a bearing unit, in the form of a radial cylindrical roller bearing, incorporating an elastic element in accordance with te present invention.

FIG. 4 shows another embodiment of the bearing unit according to the present invention, this time in the form of a radial cylindrical roller bearing. In this embodiment, the use of cylindrical rollers as rolling elements 3 and the rimless configuration of the inner race 1 causes a certain axial displaceability between the inner race 1 and the outer race 2, which must be taken into consideration when designing the components involved in the locking mechanism. In contrast to the embodiments described above and shown in FIGS. 1–3, the form-fit elements in the embodiment of FIG. 4 are not displaced in the axial direction (i.e., parallel to the shaft 17), but rather are displaced in the radial direction (i.e., transverse or perpendicular to the shaft).

To make this possible, the outer race 2 is provided with a radially extending bore 20, which is stepped in a manner similar to the bore 20 shown in FIG. 3. The bore 20 is outwardly sealed in the radial direction by the base plate 11, the inside of which is contacted by the piston 6. The piston 6 can be radially displaced within the bore 20 and is constructed in a manner similar to the piston 6 of FIG. 3 in that it has a locking pin 24. Differing from the arrangement shown in FIG. 3, however, the locking pin 24 according to FIG. 4 is arranged in the radial direction, and the end face of the piston 6 is provided with an elevation or projecting part instead of an indentation 23. The piston 6 is again preloaded by the helical spring 8 against the base plate 11. In the area where the bore 20 pierces the outer race 2 (i.e., is exposed at the surface of the outer race 2) in the radially inward direction, at least one indentation 28 in the form of an oblong hole is formed in the adjacent segment or portion of the inner race 1. The axially oblong shape of the indentation 28 permits a relatively flawless functioning of the locking mechanism despite the possible axial displacement between the inner race 1 and the outer race 2. The embodiment shown in FIG. also differs from the FIGS. 1–3 embodiments of the present invention in that the compressed air duct 13 is not provided in the base plate 11, but rather is located directly in the outer race 2. The outer cylinder surface of the outer race 2 is kept free of any superstructures to achieve the widest possible applicability of the bearing unit.

The bearing unit is shown in FIG. 4 in its unlocked state. To lock the bearing unit, compressed air is supplied via the compressed air duct 13 so that the piston 6 and thus the locking pin 27 are displaced radially inwardly in opposition to the restoring or biasing force of the helical spring 8. As a result, the locking pin 24 engages the indentation 28 of the inner race, thus establishing a form-fit connection between the inner race 1 and the outer race 2 by way of the locking bolt 24. To unlock the bearing unit, compressed air is discharged from the compressed air duct 13 so that the locking bolt 24, under the action of the restoring force or biasing force of the helical spring 8, is pushed out of the indentation 28 to thus cancel the form-fit connection.

The description set forth above regarding the number and arrangement of the locking pins 24 and the locking bores 27 in the FIG. 3 embodiment applies equally to the locking pin 24 and indentation 28 arrangement shown in FIG. 4.

Figure 5:
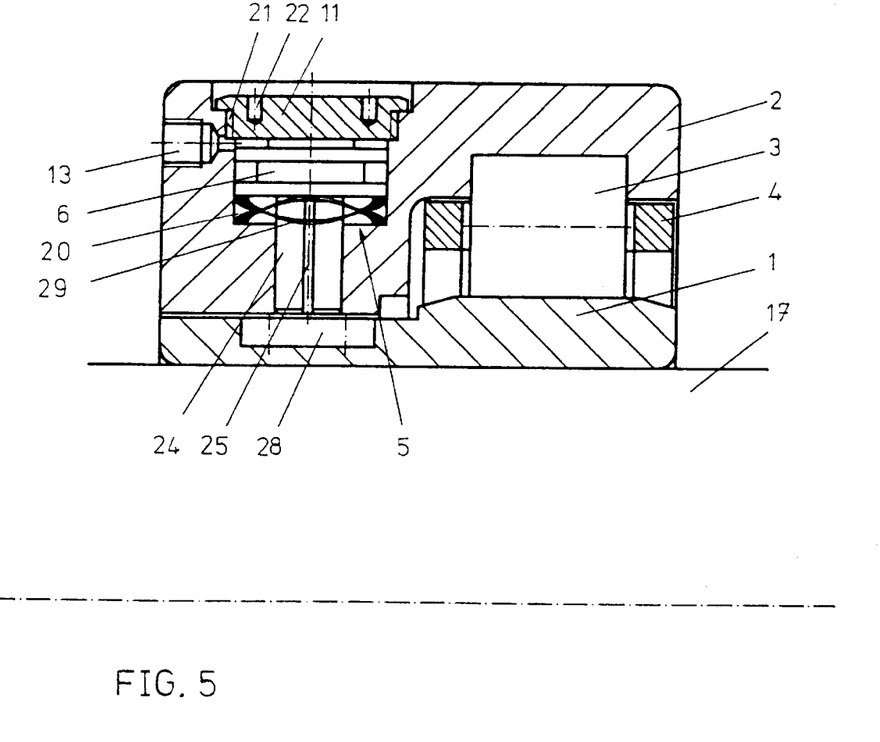
FIG. 5 is a cross-sectional view of a bearing unit, in the form of a radial cylindrical roller bearing, incorporating a different elastic element in accordance with te present invention.

FIG. 5 shows a further embodiment of the bearing unit according to the invention in the form of a radial cylindrical roller bearing. This embodiment differs from the embodiment of FIG. 4 in that a flat wire compression spring 29 is used instead of the helical spring 8. The flat wire compression spring 29 is distinguished by its axially very compact design, thus permitting a particularly compact overall construction of the locking device.

As a variation on the embodiments depicted in FIGS. 4 and 5, the locking mechanism can also be installed on the inner race 1 and cooperate with an indentation 28 formed in the outer race 2.

In the embodiments described above, the locking device 5 is controlled by compressed air. However, as already indicated above with respect to the embodiment depicted in FIG. 1, it is also possible to use hydraulic fluid under pressure to control the locking device. Of course, this may require minor modifications in the components used, and the system may have to be sealed accordingly.

It is also possible to modify the bearing unit according to the present invention for mechanical control, e.g., by way of a pull wire or linkage rod.

A particularly interesting variation involves effecting control by electrical or magnetic means. For electrical control, the bearing unit can be equipped with one or several electromagnets or electric motors which transport mechanical locking elements into a locked or a release position when an electric current is applied. Magnetic control could be implemented through the use of permanent magnets which respond to a field generated by an external electromagnet and thereby activate or deactivate the lock. Electrical control and magnetic control make it possible on the one hand to activate or deactivate the locking mechanism very rapidly and on the other hand, if so desired, to make it contactless, which means that supply leads do not necessarily have to be connected to the bearing unit.

For illustrative purposes, FIG. 1 includes a schematic depiction of the actuator 32 for controlling the operation of the lock device 5 associated with each of the embodiments of the inventions to effect the remote control changeover of the locking device. As noted above, the remote control changeover between the locked and unlocked states of the lock device can be effected through electrical, magnetical, pneumatic, hydraulic or mechanical actuation.

As also described above, the locking device is positionable in a first operating state permitting relative rotational movement between the two bearing rings and a second operating state interconnecting the two bearing rings. The locking device includes an elastic element that applies a biasing force to the actuator or piston. The elastic element cooperates with the actuator in such a way that upon non-actuation of the actuator, the locking device assumes a standby state. This standby state can be constituted by either the first operating state or the second operating state of the locking device.

In all the embodiments mentioned above, the locking device 5 is arranged on the bearing ring, which in operation does not rotate relative to the control device that controls the locking device. This simplifies the connection in the form of compressed air hoses, cables, etc. between the control device and locking device 5.

The bearing unit is preferably locked when it is stopped, i.e., when the inner race 1 and outer race 2 are not rotating relative to one another, since the abrupt braking process caused by the form-fit engagement could otherwise damage the bearing unit or the bearing supported machine parts.

Depending on the embodiment, a slow rotational movement may be permitted to activate the lock. That is, locking may be possible below a threshold speed value.

Information on the rotational state of the bearing unit is oftentimes available in many applications, for instance the operating parameters of a drive motor, or can be determined by a speed sensor which can be optionally integrated in the bearing unit. FIG. 2 provides a schematic illustration of such a speed sensor 30 that is adapted to measure the movement of the teeth 16.

In addition to the described radial rolling contact bearings, the bearing unit according to the invention can also be configured as a radial bearing of a different type of construction as well as a thrust bearing and a plain bearing. Whatever the arrangement, a form-fit connection is produced between a first and a second bearing ring by way of a locking element. Other machine parts not belonging to the bearing unit are not required.

The present invention provides a variety of advantages. For example, in contrast to a friction brake, the form-fit connection utilized here is able to achieve a relatively reliably and precise lock against rotation, even at relatively high torques. Also, relatively little power is required to create or cancel the operation of the lock and so little difficulties arise with respect to dissipating heat. In addition, the design is relatively compact and thus can be used even in bearings with small geometric dimensions. It is also generally possible to eliminate brake linings which are subject to wear and thus cause additional maintenance costs.

The integration of the locking device into the bearing unit advantageously permits the bearing unit to be locked exclusively by components contained in or integrated into the bearing unit. Thus, external machine parts are generally not required, other than perhaps the necessary control connection. That is, the bearing unit according to the present invention can be mounted like a conventional bearing and does not require any significantly special installation environment.

The form-fit connection between the first and second bearing rings can advantageously be produced in many different ways. This allows the conditions of a specific application to be optimally taken into account. For instance, a relatively precise lock between the inner and outer raceways by mutually engaging gear teeth can be employed as can an inexpensive and highly compact lock produced by way of a pin and bore combination. The bearing unit according to the present invention also has a wide range of applications and a generally universal use in that it can be configured for all the usual control methods such as pneumatic control, hydraulic control, mechanical control, electrical or magnetic control.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. A bearing unit comprising:
   a first bearing ring mounted about a shaft;
   a second bearing ring mounted about the shaft, the first and second bearing rings being relatively rotatable with respect to one another;
   a locking device that selectively locks the first bearing ring relative to the second bearing ring, the locking device including a piston in the bearing unit urged in one direction by a biasing force to produce an unlocked state of the locking device in which relative rotational movement between the first bearing ring and the second bearing ring is permitted, and movable in opposition to the biasing force to produce a locked state of the locking device in which the first bearing ring and the second bearing ring are interconnected to prevent relative rotational movement of the first bearing ring and the second bearing ring; and
   a control device operatively connected to the piston to move the piston in opposition to the biasing force to produce the locked state of the locking device.

2. The bearing unit as claimed in claim 1, wherein the locking device includes a pin passing through a bore in the piston, the biasing force being produced by a spring mounted on the pin.

3. The bearing unit as claimed in claim 1, wherein the piston includes gear teeth and one of the bearing rings includes gear teeth, the gear teeth of the piston engaging the gear teeth of the bearing ring when the piston is moved in opposition to the biasing force.

4. The bearing unit as claimed in claim 1, wherein the control device moves the piston in opposition to the biasing force electrically, magnetically, pneumatically, hydraulically or mechanically.

5. The bearing unit as claimed in claim 1, wherein the piston includes a bore through which passes a bolt, one end of the bolt threadably engaging a portion of one of the bearing rings, and the biasing force being produced by a spring mounted on the bolt.

6. The bearing unit as claimed in claim 1, including a locking pin extending from one end of the piston and a locking bore in one of the bearing rings, the locking pin being movable into the locking bore when the piston is moved in opposition to the biasing force.

7. The bearing unit as claimed in claim 1, wherein the piston moves in a direction parallel to the shaft.

8. The bearing unit as claimed in claim 1, wherein the piston moves in a direction transverse to the shaft.

9. The bearing unit as claimed in claim 1, wherein the biasing force is produced by a helical spring or a flat wire compression spring.

10. A bearing unit comprising:
    a first bearing ring,
    a second bearing ring which is rotatable relative to the first bearing ring;
    a locking device comprising a movable element positionable in a first operating state in which engaging elements provided at the movable element and one of the first and second bearing rings are disengaged from one another to permit relative rotational movement between the first bearing ring and the second bearing ring and a second operating state in which the engaging elements mechanically interfit with one another to interconnect the first bearing ring and the second bearing ring in a form-fit connection;
    the locking device being integrated into the bearing unit;
    the locking device being switchable between the first and the second operating state by remote control.

11. The bearing unit as claimed in claim 10, wherein the locking device has movable element and create or cancel the form-fit connection.

12. The bearing unit as claimed in claim 11, wherein the locking device has at least one elastic element cooperating with the actuator in such a way that upon non-actuation of the actuator the locking device assumes a standby state constituted by either the first operating state or the second operating state of the locking device.

13. The bearing unit as claimed in claim 11, wherein the engaging elements include gear teeth on both the movable element and the one of the first and second bearing rings.

14. The bearing unit as claimed in claim 11, wherein the engaging elements include a pin and a bore, the pin engaging the bore in the second operating state of the locking device.

15. The bearing unit as claimed in claim 10, wherein the remote control switching between the first and second operating states of the locking device is effected electrically, magnetically, pneumatically, hydraulically or mechanically.

16. The bearing unit as claimed in claim 15, the remote control switching between the first and second operating states of the locking device is effected in a contactless manner.

17. The bearing unit as claimed in claim 10, wherein the first bearing ring and/or the second bearing ring is connected in a form-fit manner with at least one adjacent machine part.

18. The bearing unit as claimed in claim 10, including a speed sensor integrated into the bearing unit.

19. The bearing unit as claimed in claim 10, wherein the bearing unit is a radial bearing and has rolling elements, and the locking device is axially adjacent to the rolling elements.

20. The bearing unit as claimed in claim 10, wherein the lock device is remote controlled by way of an actuator which is operable to move the movable element back and forth between the first and second operating states.

21. A bearing unit comprising:
    a first bearing ring,
    a second bearing ring which is rotatable relative to the first bearing ring;
    a locking device positionable in a first operating state permitting relative rotational movement between the first bearing ring and the second bearing ring and a second operating state interconnecting the first bearing ring and the second bearing ring in a form-fit connection;
    the locking device having at least one movable form-fit element for effecting form-fit engagement with a portion of the first bearing ring or the second bearing ring, and at least one actuator to displace the form-fit element and create or cancel the form-fit engagement;
    the locking device having at least one elastic element cooperating with the actuator in such a way that upon non-actuation of the actuator the locking device assumes a standby state constituted by either the first operating state or the second operating state of the locking device;

the form-fit element being constituted by gear teeth, and said portion of the first bearing ring or the second bearing ring is constituted by gear teeth which engage the gear teeth constituting the form-fit element in the second operating state of the locking device;

the locking device being integrated into the bearing unit; and the locking device being switchable between the first and the second operating state by remote control.

22. A bearing unit comprising:

a first bearing ring, a second bearing ring which is rotatable relative to the first bearing ring;

a locking device positionable in a first operating state permitting relative rotational movement between the first bearing ring and the second bearing ring and a second operating state interconnecting the first bearing ring and the second bearing ring in a form-fit connection;

the locking device having at least one movable form-fit element for effecting form-fit engagement with a portion of the first bearing ring or the second bearing ring, and at least one actuator to displace the form-fit element and create or cancel the form-fit engagement;

the locking device having at least one elastic element cooperating with the actuator in such a way that upon non-actuation of the actuator the locking device assumes a standby state constituted by either the first operating state or the second operating state of the locking device;

the form-fit element being a pin and the portion of the first bearing ring or the second bearing ring is a bore, the pin engaging the bore in the second operating state of the locking device;

the locking device being integrated into the bearing unit; and the locking device being switchable between the first and the second operating state by remote control.

* * * * *